US007982804B2

(12) United States Patent
Uzawa et al.

(10) Patent No.: US 7,982,804 B2
(45) Date of Patent: Jul. 19, 2011

(54) IMAGE PROCESSING APPARATUS AND IMAGE PROCESSING METHOD

(75) Inventors: Takehiro Uzawa, Yokohama (JP); Masato Oshikiri, Tokyo (JP); Haruki Takata, Yokohama (JP); Hidenori Takata, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 1135 days.

(21) Appl. No.: 11/604,809

(22) Filed: Nov. 28, 2006

(65) Prior Publication Data

US 2007/0120864 A1 May 31, 2007

(30) Foreign Application Priority Data

Nov. 28, 2005 (JP) ................................ 2005-341646

(51) Int. Cl.
*H04N 5/44* (2006.01)
*H04N 5/46* (2006.01)
*H04N 5/21* (2006.01)
*H04N 5/52* (2006.01)

(52) U.S. Cl. ......... 348/553; 348/555; 348/625; 348/678

(58) Field of Classification Search .......... 348/553–555, 348/571, 607, 606, 624, 625, 630, 671, 673, 348/678, 679; 345/581, 617; *H04N 5/44, H04N 5/14, 9/64, 5/21, 5/526*
See application file for complete search history.

(56) References Cited

U.S. PATENT DOCUMENTS

| | | | | |
|---|---|---|---|---|
| 7,450,182 | B2 * | 11/2008 | Nakajima et al. | 348/625 |
| 2003/0142236 | A1 * | 7/2003 | Aratani et al. | 348/554 |

FOREIGN PATENT DOCUMENTS

| | | |
|---|---|---|
| JP | 07-274090 | 10/1995 |
| JP | 11-027602 | 1/1999 |
| JP | 2000-350144 | 12/2000 |
| JP | 2004-304561 | 10/2004 |

* cited by examiner

*Primary Examiner* — Sherrie Hsia
(74) *Attorney, Agent, or Firm* — Antonelli, Terry, Stout & Kraus, LLP.

(57) ABSTRACT

Image quality adjustment of an inputted image signal is performed with higher accuracy to display a more preferable image to the user. An attribute information determining unit obtains first attribute information indicating the format of the inputted image signal and second attribute information indicating transmission characteristics of the image signal. An image quality adjustment value calculating unit calculates optimal image quality adjustment values for the image signal from the obtained first and second attribute information. An image processing unit adjusts the image quality of the image signal based on the optimal image quality adjustment values and then outputs the image to an image display. The second attribute information includes the bit rate, resolution, and frame rate of the image signal.

6 Claims, 5 Drawing Sheets

FIG.2

40

| FORMAT | IMAGE QUALITY ADJUSTMENT OFFSET VALUES | | |
|---|---|---|---|
| | ENHANCER | NOISE REDUCTION NR | CONTRAST |
| JPEG | $EN_{JP}$ | $NR_{JP}$ | $CT_{JP}$ |
| MPEG1 | $EN_{M1}(<0)$ | $NR_{M1}(>0)$ | $CT_{M1}(<0)$ |
| MPEG4 | $EN_{M4}(>EN_{M1})$ | $NR_{M4}(<NR_{M1})$ | $CT_{M4}(>CT_{M1})$ |
| Motion_JPEG | 0(REFERENCE) | 0(REFERENCE VALUE) | 0(REFERENCE) |
| • • • | • • • | • • • | • • • |
| UNCOMPRESSED | $EN_0(>0)$ | $NR_0(<0)$ | $CT_0(>0)$ |
| UNDECODABLE | 0 | 0 | 0 |

FIG.3

41

| IMAGE QUALITY EVALUATION VALUE RATIO Pr | IMAGE QUALITY ADJUSTMENT/ CORRECTION AMOUNTS | | |
|---|---|---|---|
| | ENHANCER | NOISE REDUCTION NR | CONTRAST |
| 4 | EN_Ratio_A LARGE | NR_Ratio_A SMALL | CT_Ratio_A LARGE |
| 2 | EN_Ratio_B | NR_Ratio_B | CT_Ratio_B |
| 1.5 | EN_Ratio_C | NR_Ratio_C | CT_Ratio_C |
| 1 | 0(REFERENCE VALUE) | 0(REFERENCE VALUE) | 0(REFERENCE VALUE) |
| 0.75 | EN_Ratio_D | NR_Ratio_D | CT_Ratio_D |
| 0.5 | EN_Ratio_E | NR_Ratio_E | CT_Ratio_E |
| 0.25 | EN_Ratio_F SMALL | NR_Ratio_F LARGE | CT_Ratio_F SMALL |
| UNDECODABLE | 0 | 0 | 0 |

IMAGE QUALITY EVALUATION VALUE P = (BIT RATE Br)/(RESOLUTION Re)/(FRAME RATE Fr) IN CASE OF MPEG1:P = 1000(kbps)/(320×240)/30fps IMAGE QUALITY EVALUATION VALUE Pr = (IMAGE QUALITY EVALUATION VALUE OF IMAGE TO BE DISPLAYED P1)/(IMAGE QUALITY EVALUATION REFERENCE VALUE P0 FOR THE SAME FORMAT)

IMAGE PROCESSING APPARATUS AND IMAGE PROCESSING METHOD

CLAIM OF PRIORITY

The present application claims priority from Japanese application serial no. JP 2005-341646, filed on Nov. 28, 2005, the content of which is hereby incorporated by reference into this application.

BACKGROUND OF THE INVENTION (1) Field of the Invention

The present invention relates to an image processing apparatus and an image processing method which allow an image to be displayed with a desired quality through adjustment of an inputted image signal.

(2) Description of the Related Art

Conventional television receivers and display devices are provided with a function to adjust image quality such as brightness, contrast, sharpness, etc. allowing the user to suitably adjust the image quality while displaying them on a screen. Further, techniques have been proposed for automatically adjusting the image quality according to the type of an input image.

For example, Japanese Patent Laid-open No. 7-274090 discloses an image signal processing device that stores desired image adjustment values such as brightness, contrast, hue, and color density for each of a plurality of image sources like a TV tuner, a car navigation system, a video recorder, etc. and that automatically adjusts an image according to the type of image sources.

Further, Japanese Patent Laid-open No. 2004-304561 discloses a device for performing image processing for, for example, sharpening an image for compressed image data according to compression information (compression method and compression rate) in a platemaking process or the like.

SUMMARY OF THE INVENTION

Image signals inputted from various image sources are generated in various compression formats and with various bit rates, resolutions, frame rates, and other transmission parameters. Then, these transmission parameters affect the sharpness and noise perceived by the user from the display screen. In the case of performing image adjustment, therefore, it is necessary to take into consideration not only the type, compression format, and other qualitative conditions of an image source but also quantitative conditions of the transmission parameters in order to more accurately display an image obtained from an inputted image signal.

With the techniques disclosed by the above-mentioned Japanese Patent Laid-open No. 7-274090 and Japanese Patent Laid-open No. 2004-304561, image adjustment is performed focusing attention to the type, compression format, and other qualitative conditions of an image source. Therefore, it cannot be expected that fine image adjustment be performed only with these techniques.

An object of the present invention is to provide an image processing apparatus and an image processing method for performing image quality adjustment for an inputted image signal with higher accuracy and display a more preferable image to the user.

The image processing apparatus according to the present invention comprises: an attribute information determining unit which obtains first attribute information indicating the format of an inputted image signal and second attribute information indicating transmission characteristics of the image signal; an image quality adjustment value calculating unit which calculates image quality adjustment values for the image signal from the obtained first and second attribute information; and an image processing unit which adjusts the image quality of the image signal based on the calculated image quality adjustment values and then outputs the image to an image display.

The second attribute information includes at least one of the bit rate, resolution, and frame rate of the image signal.

Further, the image processing apparatus includes a first management table for storing image quality adjustment offset values for the first attribute information and a second management table for storing image quality adjustment/correction amounts for the second attribute information. The image quality adjustment value calculating unit calculates image quality adjustment values with reference to the first and second management tables.

The image processing method according to the present invention comprises the steps of: obtaining the first attribute information indicating the format of the inputted image signal and the second attribute information indicating the transmission characteristics of the image signal; calculating image quality adjustment values for the image signal from the obtained first and second attribute information; and adjusting the image quality of the image signal based on the calculated image quality adjustment values and then displaying the image.

In accordance with the present invention, image quality adjustment is performed for the inputted image signal with higher accuracy, making it possible to display a more preferable image to the user.

BRIEF DESCRIPTION OF THE DRAWINGS

These and other features, objects and advantages of the present invention will be more apparent from the following description when taken in conjunction with the accompanying drawings.

FIG. 2 is a diagram showing an example of an offset value management table 40 according to the embodiment of the present invention.

FIG. 3 is a diagram showing an example of a correction amount management table 41 according to the embodiment of the present invention.

DETAILED DESCRIPTION OF PREFERRED EMBODIMENTS

The following explains in detail an embodiment of the present invention with reference to the accompanying drawings.

With the image processing apparatus according to the present embodiment, it is possible to input an image signal from various types of recording media used as image sources. The recording media include a removable memory card incorporating a flash memory, an optical disc (CD-R, CD-RW, DVD-RAM, DVD+R, or DVD+RW), a removable HDD, etc. It is also possible to input an image signal from an external device (digital camcorder, digital camera, DVD player, memory card reader, etc.) connected through an input unit such as a USB interface or an IEEE1394 interface (so-called DV terminal). Video image files and still image files are recorded in various formats on these recording media through digital cameras, personal computers, and other recording devices. The image processing apparatus supports various signal formats of the various recording media.

Further, the image processing apparatus according to the present invention includes a memory card interface, a USB interface, and an interface unit for accessing an optical disc drive, etc. This interface unit makes it possible to control directly image files recorded on recording media. The image processing apparatus may be incorporated in a PDPTV, a LCDTV, a projection TV, and other television receivers or may be integrated with these television receivers. Further, the image processing apparatus includes a tuner making it possible to receive and process television broadcast signals.

Figure 1:
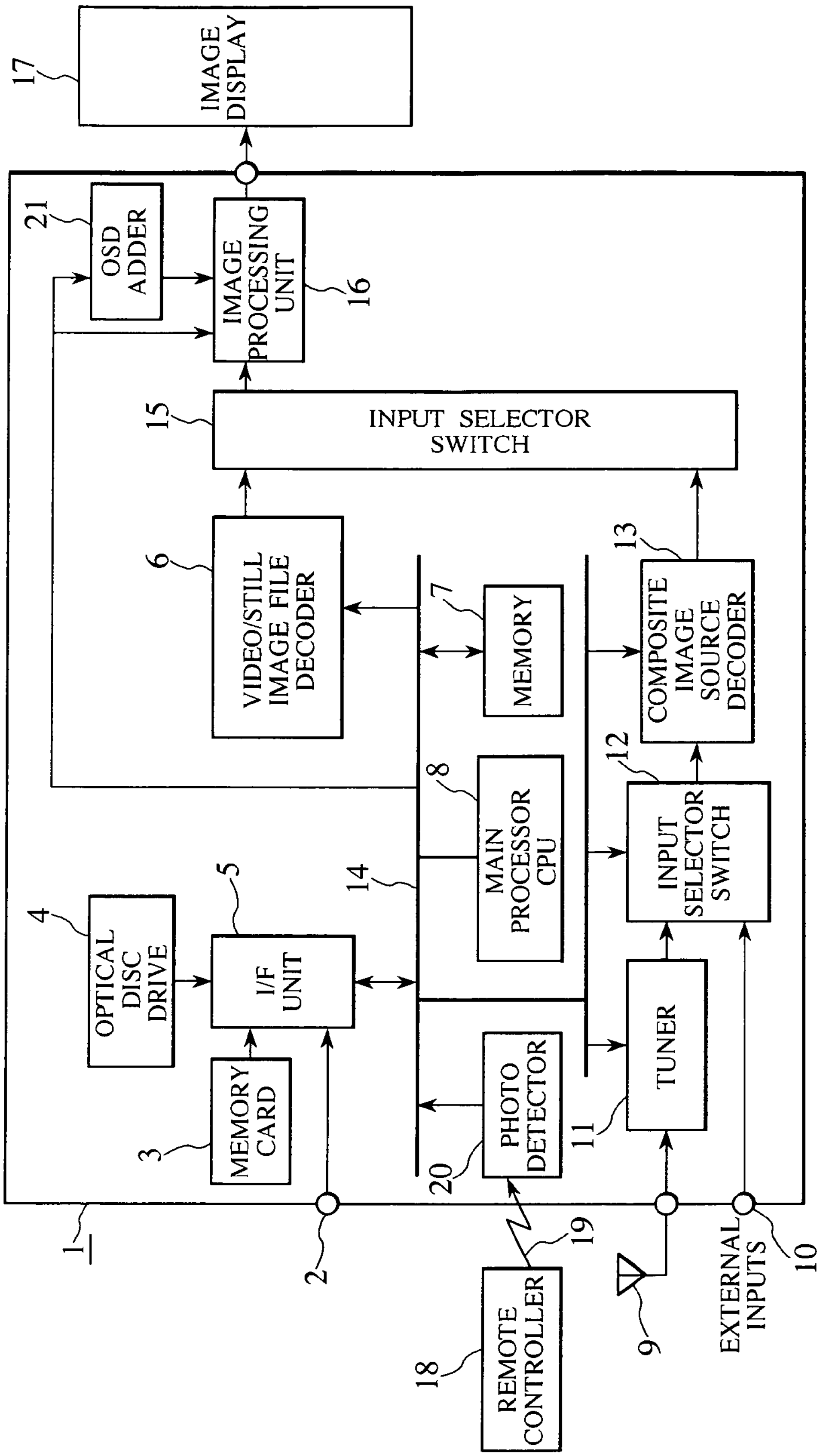
FIG. 1 is a block diagram showing an image processing apparatus according to an embodiment of the present invention.

FIG. 1 is a block diagram showing an image processing apparatus according to the embodiment of the present invention. An image processing apparatus 1 is operated according to a remote control signal 19 transmitted from, for example, a remote controller 18 utilizing infrared radiation. When a infrared photodetector 20 receives the remote control signal 19, the photodetector 20 converts the remote control signal 19 into an electrical signal and then transmits it to a main processor 8 through a bus line 14. The main processor 8, an arithmetic and control unit including a CPU (Central Processing Unit), executes the entire control of the image processing apparatus 1 based on the received remote control signal 19.

The image processing apparatus 1 includes: a USB input terminal 2 for inputting image data recorded by an external recording device (for example, a digital camcorder or a digital camera) not shown; an attachment mechanism for a memory card 3; and an optical disc drive 4. First, the following explains a signal input unit for inputting the image data (image signal). Since image data from the USB input terminal 2, image data recorded on a memory card, and image data recorded on an optical disc is stored in file formats, the above data is also referred to as an image file hereafter.

The interface unit (hereafter referred to as I/F unit) 5 includes a memory interface, a USB interface, and an interface of the optical disc drive 4. An image file inputted from each input unit is stored in a memory 7 through the I/F unit 5 and the bus line 14.

The memory 7, which is, for example, a non-volatile rewritable memory, is used for temporarily storing an inputted image file. Further, the memory 7 prestores image quality adjustment management tables (an offset value management table and a correction amount management table) for automatically adjusting the image quality based on the conditions of the inputted image file. Further, an image quality adjustment management table set by the user (user image quality adjustment value management table) can also be stored in the memory 7. The memory 7 may be partitioned into sections based on the stored contents (for example, image file and management table). The total cost can be reduced by, for example, using an inexpensive ROM that stores data of the management tables in order to reduce the capacity of the non-volatile memory.

The main processor 8 obtains image file attribute information (format, bit rate, resolution, frame rate, etc.) including the transmission characteristics from the image file stored in the memory 7 and then analyzes (identifies) the contents. Then, the main processor 8 identifies format information in the image file attribute information to determine whether the format can be processed and whether decode processing can be performed by the image processing apparatus 1. The format information of the image file indicates the file compression format or the like, for example, identification of JPEG, MPEG1, Motion_JPEG, MPEG4, etc. Further, the main processor 8 calculates image quality adjustment values with reference to the image quality adjustment management tables stored in the memory 7 according to the image file attribute information such as the bit rate, and then transmits the calculated image quality adjustment values to the image processing unit 16. Further, the main processor 8 controls a video/still image file decoder (hereafter referred to as a decoder) 6 and an OSD adder 21 to display a list (hereafter referred to as index display) of thumbnail images which are representative still images of image files.

The decoder 6 performs decode processing of the image file through control of the main processor 8 and at the same time generates an image signal (RGB signal) and an audio signal from a digital decode signal. Further, the decoder 6 creates thumbnail images used for an index display of a plurality of image files recorded, for example, in the memory card 3. Then, the decoder 6 creates an index screen, which is a list display screen of thumbnail images, in response to an instruction from the main processor 8. The index screen includes a first index screen showing a list of a plurality of thumbnail images corresponding to still image files and a second index screen showing a list of a plurality of thumbnail images corresponding to video image files. In the case of a video image file, a representative image is selected for use as a thumbnail image.

While the index screen is displayed, a thumbnail image can be selected by use of direction buttons of the remote controller 18. Using a select button of the remote controller 18, the selected thumbnail image is read from the memory card 3 and then decoded by the decoder 6.

An image/audio signal outputted from the decoder 6 is supplied to the image processing unit 16 through an input selector switch 15. The OSD adder 21 generates, through control of the main processor 8, a predetermined icon image and text information to be added to the reproduced image.

The image processing unit 16 performs predetermined image processing for the inputted image signal so as to be displayed on an image display 17 and at the same time performs image quality adjustment based on the image quality adjustment values transmitted from the main processor 8. The image processing unit 16 also superimposes the icon image and text information from the OSD adder 21 and then outputs the image to the image display 17. The image display 17, which is one of various display units (a PDP, a LCD, and a projection), displays the image signal inputted from the image processing unit 16. The image display 17 may be integrated with the image processing apparatus 1.

Further, the image processing apparatus 1 is provided with a function for receiving a television broadcast signal and a function for inputting a signal from an external device such as a video recorder. The following explains the block configurations of the above functions. Although a plurality of external input lines can be implemented, FIG. 1 shows one external input line for simplicity.

A predetermined broadcast signal is selected from television broadcast signals by a tuner 11 through control of the main processor 8 based on user operations with the remote controller 18. The television broadcast signals are received by an antenna 9. The selected broadcast signal is decoded and then outputted to the input selector switch 12. The input selector switch 12 switches between the input from the tuner 11 and a plurality of external inputs from an external input terminal 10 and then outputs a selected signal to a composite image source decoder 13. The composite image source decoder 13 converts the inputted image signal into, for example, an RGB image signal and then outputs it to the input selector switch 15. The input selector switch 15 switches between the input from the composite image source decoder 13 and the input from the decoder 6 and then outputs a selected signal to the image processing unit 16.

The following describes features of the image processing apparatus of the present embodiment. In connection with an image file recorded by, for example, a digital camera or a PC, the optimal image quality during display is affected by quantified attribute parameters (image file attribute information) including such transmission characteristics as the format, bit rate, resolution, frame rate, etc. Specifically, the format, bit rate, resolution, frame rate, and other parameters affect the sharpness of the image quality or the visibility of noise. Therefore, these parameters are important factors for image quality adjustment for optimizing the sharpness and reducing noises. As the first step of the present embodiment, therefore, deviations (hereafter referred to as offset values) of optimal image quality adjustment values corresponding to the reference setup values for image quality adjustment (reference image quality adjustment values) are tentatively calculated for each image file format. Then, the offset values are prestored in the memory 7 as a management table (hereafter referred to as offset value management table). In this case, optimal image quality adjustment values for, for example, Motion_JPEG, are employed as reference setup values for image quality adjustment.

Further, as the second step, the image quality is affected by such transmission characteristics as the bit rate, resolution, frame rate, etc. even in the same format. Accordingly, deviations (referred to as correction amounts) of optimal image quality adjustment values for each bit rate, resolution and frame rate, for the reference image quality adjustment values (offset values) defined for each format, are calculated tentatively. Then, the correction amounts are prestored in the memory 7 as a management table (hereafter referred to as correction amount management table).

In this case, the reference image quality adjustment values (offset values) are the optimal image quality adjustment values corresponding to the reference bit rate, reference resolution, and reference frame rate defined for each format. In the case of MPEG1, for example, the reference bit rate is set to 1000 kbps, the reference resolution to 320×240, and the reference frame rate to 30 fps. The optimal image quality adjustment values in this case are used as reference image quality adjustment values (offset values).

The image file attribute information (format, bit rate, resolution, frame rate) obtained from an image file to be displayed is identified by the main processor 8. Then, the offset values and correction amounts for the reference image quality adjustment values of the image file are calculated with reference to the image quality adjustment management tables (offset value management table and correction amount management table) stored in the memory 7. The image processing unit 16 automatically adjusts the image quality to the optimal conditions based on the calculated values.

The following explains in detail an image quality adjustment operation performed by the image processing apparatus of the present embodiment. Differences in the image quality caused by the differences in the format, bit rate, resolution, and frame rate include mainly differences in the sharpness and the visibility of noise. Therefore, the present embodiment utilizes enhancer, noise reduction (hereafter referred to as NR) and contrast to be actually adjusted, as image quality adjustment items.

FIG. 2 is a diagram showing an example of an offset value management table in the present embodiment. Reference numeral 40 denotes an offset value management table for setting the image quality adjustment offset values for each format of a video/still image file to be displayed, the table being prestored in the memory 7. The table 40 includes an image quality adjustment offset value for the reference image quality adjustment value (for Motion_JPEG in this case) for each of the three image quality adjustment items (enhancer, NR, and contrast) for each format (JPEG, MPEG1, MPEG4, Motion_JPEG, etc.) of the image file to be displayed. This table can also be applied to uncompressed image files.

The following explains a procedure for determining the image quality adjustment offset values in FIG. 2. Appropriate image quality adjustment offset values for various formats are tentatively determined by displaying video/still image files in various formats through the image processing apparatus and then quantitatively evaluating the image quality of displayed images. For example, the MPEG1 format provides a higher compression rate and tends to provide more undesired noises than the Motion_JPEG format which is used as the reference setup value for image quality adjustment. In this case, image quality adjustment is performed with an enhancer offset value $EN_{M1}$ smaller than the reference value (zero), an NR offset value $NR_{M1}$ larger than zero, and a contrast offset value $CT_{M1}$ smaller than zero. Further, the MPEG4 format, for example, provides less undesired noises than the MPEG1 format with the same bit rate. Taking this into consideration, to improve the sharpness in comparison with the MPEG1 format, image quality adjustment is performed with an enhancer offset value $EN_{M4}$ larger than $EN_{M1}$, an NR offset value $NR_{M4}$ smaller than $NR_{M1}$, and a contrast offset value $CT_{M4}$ larger than $CT_{M1}$.

When reproducing a file in a format which is judged to be undecodable by the main processor 8, the decoder 6 does not perform image output and therefore the image quality adjustment offset values may be set to any desired values. In this case, however, the image quality adjustment offset values are set to zero. Therefore, the image quality setup values are set as predetermined reference image quality adjustment values. In the case of an uncompressed format, it is recommended that image quality adjustment be performed with an enhancer offset value $EN_0$ larger than the reference value (zero), an NR offset value $NR_0$ smaller than zero, and a contrast offset value $CT_0$ larger than zero.

FIG. 3 is a diagram showing an example of a correction amount management table in the present embodiment. Reference numeral 41 denotes a correction amount management table. The correction amount management table 41 is used for setting image quality adjustment/correction amounts for each "image quality evaluation value ratio" calculated by using the format, bit rate, resolution, and frame rate of the video/still image file to be displayed. The table containing the set amounts is prestored in the memory 7. The following explains a method for calculating an image quality evaluation value ratio Pr. Firstly, in the case of a video image file, the following formula is satisfied:

[Bit rate]=[Resolution]×[Frame rate]×[Number of bits per pixel]

Accordingly, the larger the number of bits per pixel is, the higher the image quality that can be expected is. Therefore, an image quality evaluation value P is calculated by the following formula:

$$[\text{Image quality evaluation value}(P)]=[\text{Bit rate}(Br)]/[\text{Resolution}(Re)]/[\text{Frame rate}(Fr)]$$

Subsequently, a value calculated by applying the reference bit rate, reference resolution, and reference frame rate defined for each format to the above-mentioned formula is used as an image quality evaluation reference value P0 predetermined for each format. Then, a ratio of an image quality evaluation value P1 of the video image file to be displayed to the image quality evaluation reference value P0 corresponding to the format is calculated. Then, the image quality evaluation value ratio Pr is calculated by the following formula:

$$[\text{Image quality evaluation value ratio}(Pr)]=[\text{Image quality evaluation value}(P1)]/[\text{Image quality evaluation reference value}(P0)]$$

When the video image file to be displayed has the reference bit rate, reference resolution, and reference frame rate predetermined for the format, the image quality evaluation value ratio Pr becomes 1 through the above-mentioned formula. Therefore, the optimal image quality adjustment values at this time are set as reference image quality adjustment values. On the other hand, when the image quality evaluation value ratio Pr is a value other than 1, correction is made for the reference image quality adjustment values with respect to the three adjustment items (enhancer, NR, and contrast). FIG. 3 shows image quality adjustment/correction amounts when the image quality evaluation value ratio Pr is 4, 2, 1.5, 0.75, 0.5, and 0.25.

The following explains a procedure for determining the image quality adjustment/correction amounts in FIG. 3. Appropriate image quality adjustment/correction amounts corresponding to various image quality evaluation value ratios Pr are determined tentatively by displaying video image files with various bit rates through the image processing apparatus and quantitatively evaluating the image quality of the displayed images. For example, with a high bit rate, a low resolution, and a low frame rate, the image quality evaluation value ratio Pr becomes larger than 1 resulting in high definition and low visibility of noise. In this case, image quality adjustment/correction is performed with enhancer correction amounts EN_Ratio_A to C larger than zero, NR correction amounts NR_Ratio_A to C smaller than zero, and contrast correction amounts CT_Ratio_A to C larger than zero. On the other hand, with a low bit rate, a high resolution, and a low frame rate, the image quality evaluation value ratio Pr becomes smaller than 1 resulting in a high compression rate and high visibility of noise. In this case, image quality adjustment/correction is performed enhancer correction amounts EN_Ratio_D to F smaller than zero, NR correction amounts NR_Ratio_D to F larger than zero, and contrast correction amounts CT_Ratio D to F smaller than zero. If there is no image quality evaluation value ratio which coincides with that of the image file to be displayed, the image quality adjustment/correction amounts for the closest image quality evaluation value ratio are applied. In the case of a file in a format which is judged to be undecodable by the main processor 8, the decoder 6 does not perform image output and therefore the image quality adjustment/correction amounts may be any desired values. In this case, the image quality adjustment/correction amounts are set to zero. Further, if a file does not have frame rate information (unspecified) like a still image file and therefore the image quality evaluation value ratio Pr cannot be calculated, the image quality adjustment/correction amounts may be zero.

With reference to the above-mentioned offset value management table 40 and correction amount management table 41, the image quality adjustment offset values and the image quality adjustment/correction amounts for the image file to be displayed are read from the tables. Then, an offset value and a correction amount are added to obtain a final image quality adjustment value for each of the three adjustment items (enhancer, NR, and contrast) and then the image quality to be displayed is adjusted. For example, in the case of an image file with a bit rate of 200 kbps, a resolution of 320×240, and a frame rate of 30 fps in the MPEG1 format (with a reference bit rate of 1000 kbps, a reference resolution of 320×240, and a frame rate of 30 fps predetermined for the format), the image quality evaluation value ratio Pr is 2. Therefore, the final image quality adjustment value for the enhancer adjustment item is ($EN_{M1}$+EN_Ratio_B).

Thus, in accordance with the present embodiment, the image quality is adjusted based on the attribute parameters of the image file to be displayed, allowing finer adjustment than the conventional techniques. Specifically, the image accuracy can be improved since adjustment is performed focusing attention to qualitative conditions such as the file format and quantitative conditions during transmission such as the bit rate.

Figure 4:
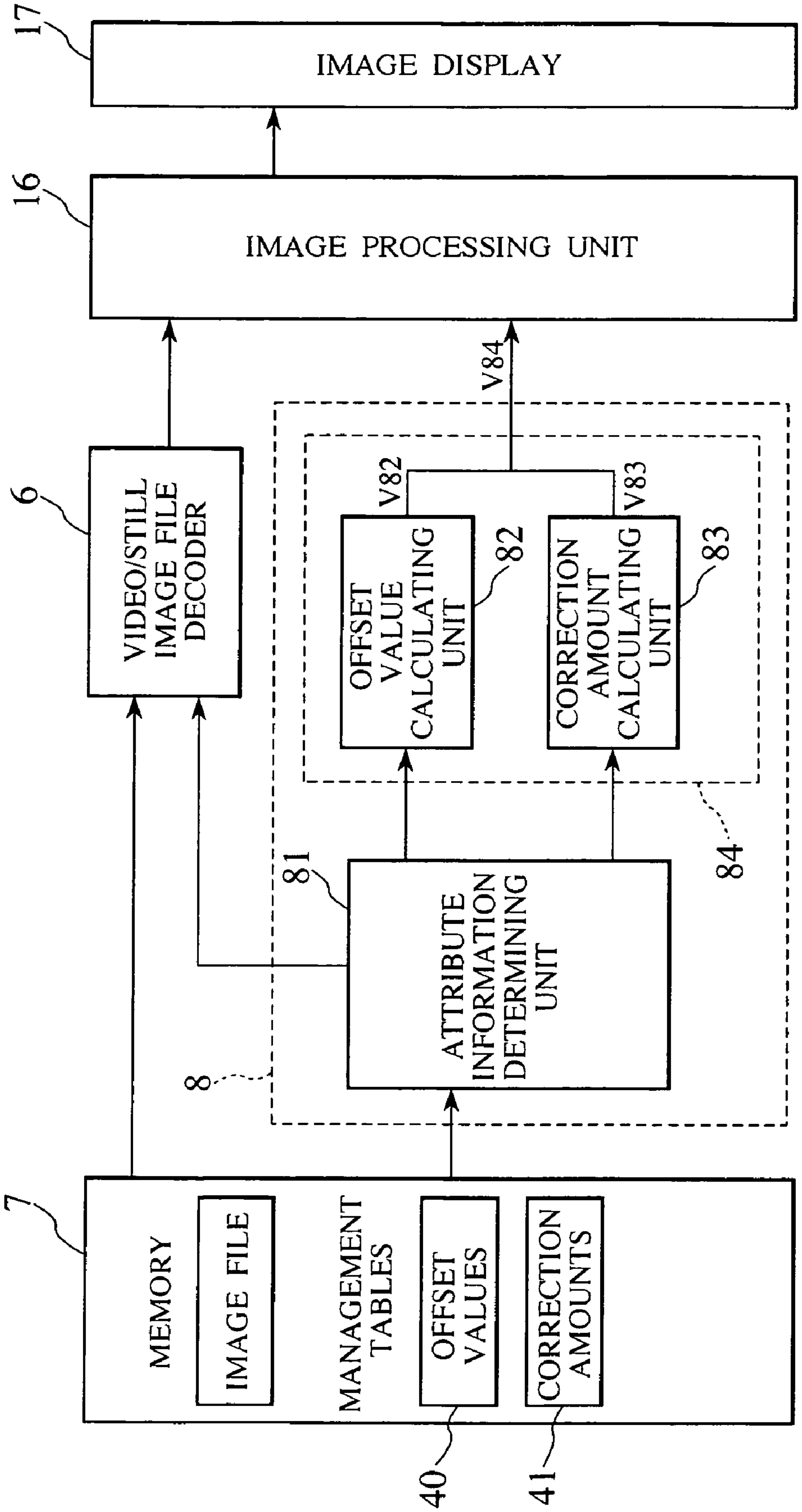
FIG. 4 is a diagram showing a block configuration concerning automatic image quality adjustment according to the embodiment of the present invention.

Utilizing the above-mentioned correction amount management table 41 requires information of all the parameters. However, even if not all the parameters can be obtained, it is also possible to perform image quality adjustment to obtain an image with quality similar to the above-mentioned image quality by use of a part of the obtained information. It is also possible to prepare a formula for calculating image quality evaluation values and management tables. Further, the above-mentioned attribute parameters are example parameters which are effective in particular for image quality adjustment, and are not limited. This also applies to the following description:

FIG. 4 is a diagram showing a block configuration concerning automatic image quality adjustment with the image processing apparatus of the present embodiment. The memory 7 stores the data of the image file to be displayed, as well as the above-mentioned offset value management table 40, the correction amount management table 41, and the user image quality adjustment value management table (not shown) as a database.

The main processor 8 includes the attribute information determining unit (hereafter referred to as attribute determining unit) 81 and the image quality adjustment value calculating unit 84. Further, the image quality adjustment value calculating unit 84 includes an image quality adjustment offset value calculating unit (hereafter referred to as offset value calculating unit) 82 and an image quality adjustment/correction amount calculating unit (hereafter referred to as correction amount calculating unit) 83. Each unit is configured by software.

The attribute determining unit 81 reads from the memory 7 the video/still image file data to be displayed and at the same time obtains image file attribute information (format information, bit rate information, resolution information, and frame rate information) from the data. Image files include image files of still images (still image files) and image files of video images (video image files). Usually, an image file has an extension. Therefore, it is only necessary to identify the extension in order to obtain the format information. The present embodiment assumes JPG as an extension of still image files and AVI, MOV, MPG, ASF, MP4, etc., as an extension of video image files. The extensions are not limited to the above types and other types of extensions may be included. Further, a file with a different codec can be distinguished as a different format even if the file has the same extension. The format information thus obtained is used for determining whether the format can be decoded by the decoder 6 of the image processing apparatus. Then, the bit rate information, resolution information, and frame rate information are obtained from the information included in the header of an image file. These pieces of information can also be obtained in real time from a video/still image file that is being processed by the decoder 6.

The image quality adjustment value calculating unit 84 calculates optimal image quality adjustment values based on the above-mentioned image file attribute information obtained and then transmits the image quality adjustment values to the image processing unit 16. The offset value calculating unit 82 included in the image quality adjustment value calculating unit 84 references the offset value management table 40 stored in the memory 7 based on the above-mentioned format information and decodable/undecodable information obtained, and then selects and reads each of image quality adjustment offset values V82 that meet the conditions. Further, the correction amount calculating unit 83 executes processing of: calculating the image quality evaluation value ratio based on the above-mentioned format information, bit rate information, resolution information, frame rate information, and decodable/undecodable information obtained; referencing the correction amount management table 41 stored in the memory 7; and selecting and reading each of image quality adjustment/correction amounts V83 that meet the conditions. Then, the image quality adjustment value calculating unit 84 adds these values (V82 and V83) to obtain each of final image quality adjustment values V84, and then transmits them to the image processing unit 16.

The decoder 6 obtains the decodable/undecodable information of the video/still image file from the attribute determining unit 81. When the file is decodable, the decoder 6 decodes the image data read from the memory 7 and then transmits the decoded data to the image processing unit 16.

The image processing unit 16 performs image quality adjustment of the image transmitted from the decoder 6 based on each of the final image quality adjustment values V84 obtained from the image quality adjustment value calculating unit 84. The image display 17 displays on the monitor the image transmitted from the image processing unit 16.

The attribute determining unit 81 always monitors the inputted image file. When the video/still image file to be displayed is changed, the attribute determining unit 81 immediately obtains the bit rate information, resolution information, and frame rate information and transmits these pieces of information to related processing units. After the transmission, the offset value calculating unit 82 and the correction amount calculating unit 83 immediately calculate the image quality adjustment values based on new conditions. Therefore, when the image file to be displayed is changed, appropriate image quality adjustment processing can be performed automatically and immediately.

Figure 5:
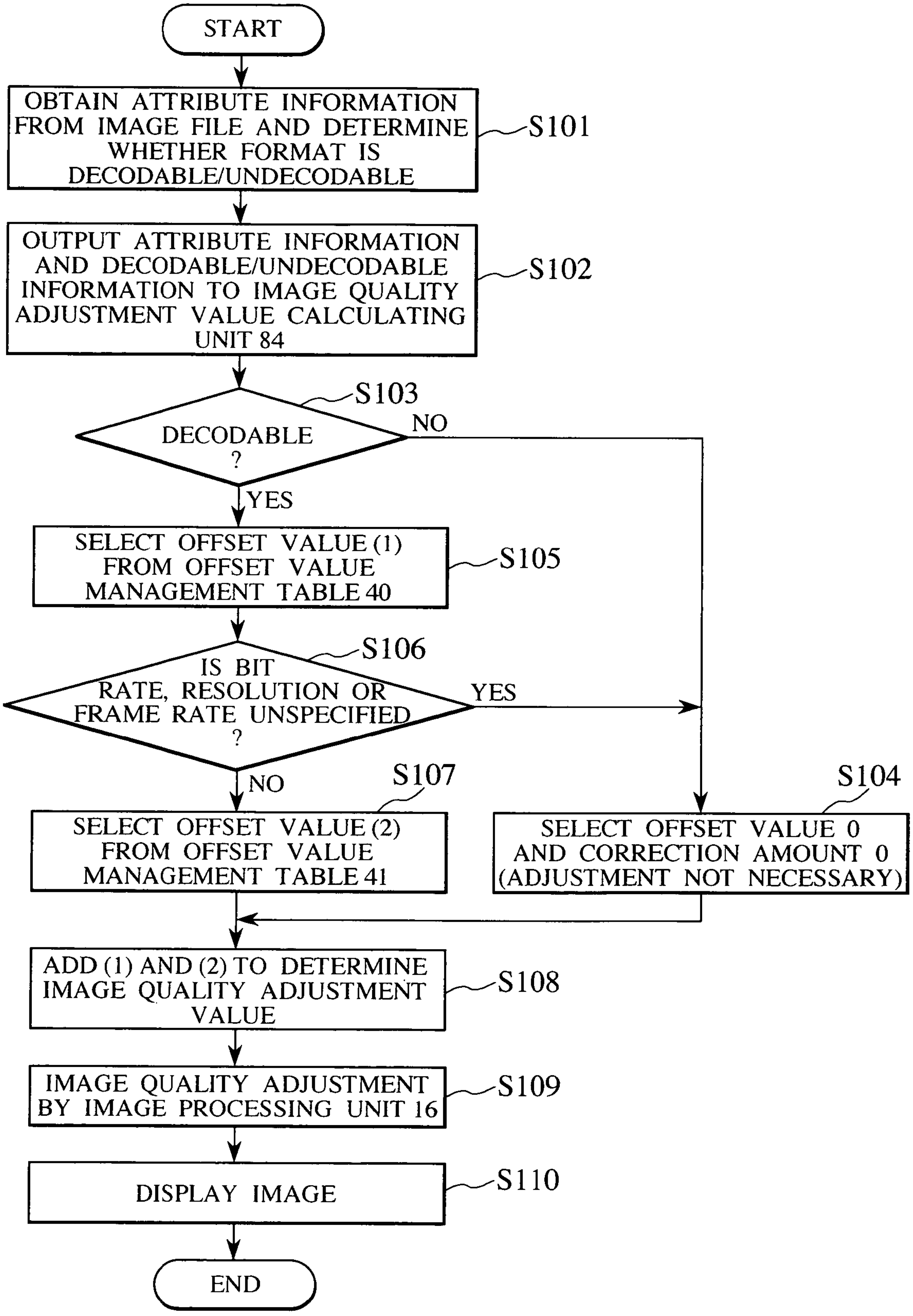
FIG. 5 is a flow chart showing an image quality adjustment processing method according to the embodiment of the present invention.

The following explains the above-mentioned image quality adjustment processing by use of a flow chart. FIG. 5 is a flow chart showing an image quality adjustment processing method in the present embodiment. The attribute determining unit 81 obtains the attribute information (format information, bit rate information, resolution information, and frame rate information) from the image file to be displayed; determines whether the format is decodable or undecodable by use of the format information (Step S101); and outputs the obtained attribute information and the decodable/undecodable information to the image quality adjustment value calculating unit 84 (Step S102). The image quality adjustment value calculating unit 84 executes processing of: conditional branching based on the decodable/undecodable information (Step S103); when the format is judged to be undecodable (No) in Step S103, selecting offset values 0 for undecodable format from the offset value management table 40; selecting correction amounts 0 for undecodable format from the correction amount management table 41 (Step S104); when the format is judged to be decodable (Yes) in Step S103, referencing the offset value management table 40 and then selecting the image quality adjustment offset values corresponding to the obtained format information (Step S105); determining whether any of the obtained bit rate, resolution, and frame rate is unspecified (Step S106); when any of these parameters is judged to be unspecified (Yes) in Step S106, selecting correction amounts 0 for unspecified parameters from the correction amount management table 41 (S104); when none of these parameters is judged to be unspecified (No) in Step S106, referencing the correction amount management table 41 and then selecting image quality adjustment/correction amounts of the image quality evaluation value ratio which is closest to the evaluation value ratio calculated from the obtained bit rate, resolution, and frame rate (Step S107); and adding the offset values selected in Step S105 and the correction amounts selected in Step S107 to obtain image quality adjustment values and then transmitting them to the image processing unit 16 (Step S108). The image processing unit 16 performs image quality adjustment for the image signal from the decoder 6 based on the received image quality adjustment values and then outputs the image to the image display 17 (Step S109). The image display 17 displays on the monitor the image with the image quality adjusted (Step S110). In Step S109, image quality adjustment can also be performed by reflecting user image quality adjustment values separately set by the user.

The image processing apparatus in the present embodiment obtains optimal image quality adjustment values at the time of display through calculation according to the format, bit rate, resolution, and frame rate of various video/still image files and then automatically adjusts the image quality to be displayed. Therefore, the image processing apparatus allows the user to attain fine image quality adjustment without performing cumbersome image quality adjustment each time an image file is changed, resulting in improved user-friendliness.

The present invention is not limited to the above embodiment and may be embodied in other specific forms without departing from the spirit or essential characteristics thereof. In the above-mentioned embodiment, described is the case where the inputted image signal has an image file format. However, the embodiment is not limited to this case and may be applied to a receive signal of television broadcast or the like regardless of the signal form. Further, the explained attribute parameters for image quality adjustment are example ones. These parameters may be set arbitrarily according to a product and a signal form to be applied.

While we have shown and described several embodiments in accordance with our invention, it should be understood that disclosed embodiments are susceptible to changes and modifications without departing from the scope of the invention. Therefore, we do not intend to be bound by the details shown and described herein but intend to cover all such changes and modifications as fall within the ambit of the appended claims.

What is claimed is:

1. An image processing apparatus used for displaying an image obtained from an inputted image signal on an image display, the image processing apparatus comprising:

an attribute information determining unit which obtains first attribute information indicating the format of the inputted image signal and second attribute information indicating transmission characteristics of the image signal;

an image quality adjustment value calculating unit which calculates image quality adjustment values for the image signal based on the first and second attribute information obtained by the attribute information determining unit; and an image processing unit which adjusts the image quality of the image signal based on the image quality adjustment values calculated by the image quality adjustment value calculating unit and then outputs the image to the image display, wherein the image quality adjustment value calculating unit, calculates an image quality evaluation value (P) by the formula (P=Br/Re/Fr) of the bit rate (Br), Resolution (Re) and frame rate (Fr) included in the second attribute information.

fixes an image quality evaluation reference value (P0) based on a value calculated by applying the reference bit rate, reference resolution and reference frame rate defined for each format in the first attribute information to the above formula, calculates an image quality evaluation value ratio (Pr) by the formula (Pr=P1/P0) of an image quality evaluation value (P1) of the video image file to be displayed and the image quality evaluation reference value (P0) corresponding to the format, and decides the image quality adjustment value for the image signal using the image quality evaluation value ratio (Pr).

2. The image processing apparatus according to claim 1, comprising:

a first management table for storing image quality adjustment offset values corresponding to the first attribute information; and a second management table for storing image quality adjustment/correction amounts corresponding to the second attribute information;

wherein the image quality adjustment value calculating unit calculates the image quality adjustment values with reference to the first and second management tables.

3. The image processing apparatus according to claim 1, wherein items subjected to image adjustment by the image processing unit are at least one of enhancer, noise reduction, and contrast of the image quality.

4. An image processing method for displaying an image obtained from an inputted image signal, the method comprising the steps of:

obtaining first attribute information indicating the format of an inputted image signal and second attribute information indicating transmission characteristics of the image signal;

calculating image quality adjustment values for the image signal from the obtained first and second attribute information; and displaying the image obtained from the image signal through adjustment of the image signal based on the calculated image quality adjustment values, wherein the step of calculating image quality adjustment values includes, calculating an image quality evaluation value (P) by the formula (P=Br/Re/Fr) of the bit rate (Br), resolution (Re) and frame rate (Fr) included in the second attribute information, fixing an image quality evaluation reference value (P0) based on a value calculated by applying the reference bit rate, reference resolution and reference frame rate defined for each format in the first attribute information to the above formula, calculating an image quality evaluation value ratio (Pr) by the formula (Pr=P1/P0) of an image quality evaluation value (P1) of the video image file to be displayed and the image quality evaluation reference value (P0) corresponding to the format, and deciding the image quality adjustment value for the image signal using the image quality evaluation value ratio (Pr).

5. The image processing method according to claim 4, further comprising the steps of:

determining image quality adjustment offset values based on the first attribute information;

determining image quality adjustment/correction amounts based on the second attribute information; and obtaining image quality adjustment values by adding the image quality adjustment offset values to the image quality adjustment/correction amounts.

6. The image processing method according to claim 4, wherein items subjected to image quality adjustment are at least one of enhancer, noise reduction, and contrast of the image quality.

* * * * *